Dec. 11, 1934.  C. LIBRETT  1,984,274
CLOTHESLINE ANCHORING DEVICE
Filed March 28, 1934
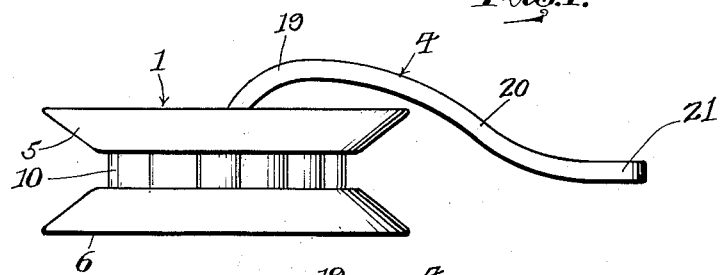
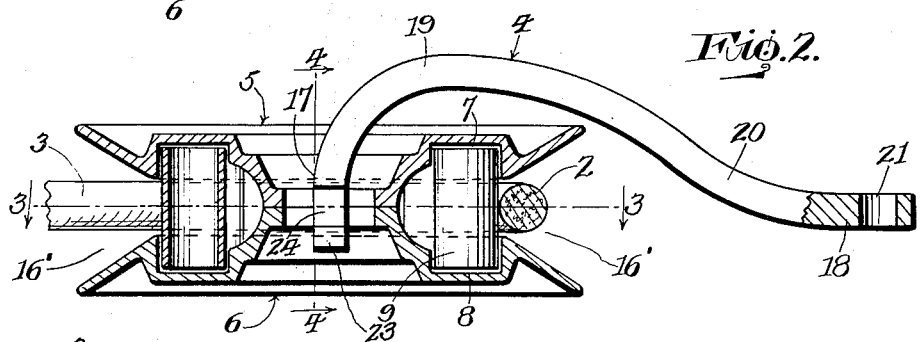
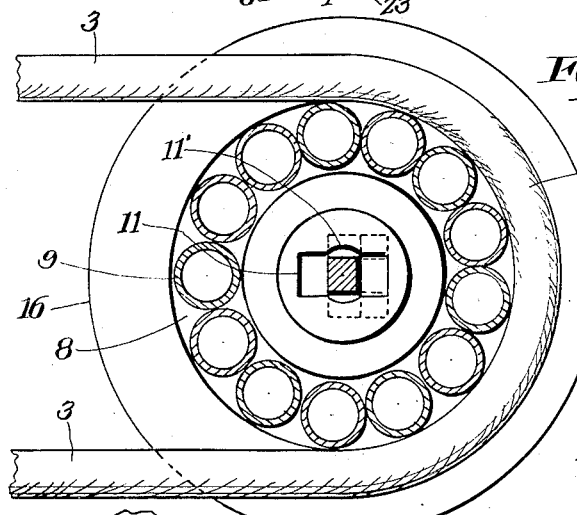
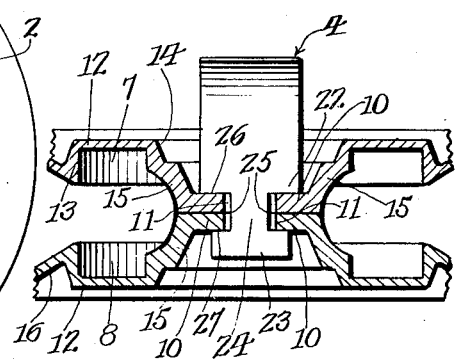
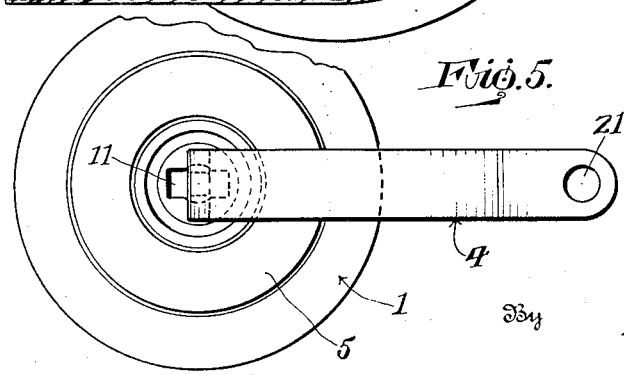
Inventor
Chester Librett
By Geo. F. Kimmel
Attorney Patented Dec. 11, 1934

1,984,274

UNITED STATES PATENT OFFICE 1,984,274

CLOTHESLINE ANCHORING DEVICE

Chester Librett, New Rochelle, N. Y., assignor of one-half to Nicholas A. Rabelos, New Rochelle, N. Y.

Application March 28, 1934, Serial No. 717,867

8 Claims. (Cl. 254—190)

This invention relates to a combined bearing, suspending, guiding and anchoring devices designed primarily for use in connection with a stretch of a clothes line, when the latter is used in a manner whereby it is pulled in a direction towards or from a housewife, maid or washerwoman for the purpose of attaching or detaching from the line articles being laundered, but it is to be understood, that a device, in accordance with this invention may be used in any connection for which it may be found applicable.

The objects of the invention are to provide, in a manner as hereinafter referred to, a device of the class referred to which is of reel-like form; strong; durable; compact; thoroughly efficient in its use for the purpose intended thereby; conveniently anchored in position and installed with respect to the line; readily repaired when occasion requires; capable of having a damaged part removed and a new part quickly installed thereby overcoming the necessity of discarding the entire device when a part thereof becomes damaged or impaired; and inexpensive to manufacture.

To the above ends essentially, and to others which may hereinafter appear the invention consists of such parts, and such combination of parts which fall within the scope of the invention as claimed.

In the drawing:

Figure 1 is a side elevation of the device,

Figure 2 is a longitudinal sectional view of the device,

Figure 3 is a section on line 3—3, Figure 2,

Figure 4 is a section on line 4—4, Figure 2, and

Figure 5 is a top plan, broken away of the device.

The device, in accordance with this invention consists of a combined bearing, retaining and guiding structure 1 for the stretch 2 of the line 3, and an anchoring and suspension element 4 for and which suspends the structure 1, in position to receive the stretch 2.

The structure is of circular contour and includes a pair of oppositely disposed cheeks 5, 6 of like construction and which coact and provide a pair of spaced parallel circular races or grooves 7, 8 for the ends of tubular bearing members 9. These latter are independent of each other and are arranged in the form of an annular group.

Each of the cheeks is in the form of a cuplike plate and includes a flat circular hub part 10 formed centrally thereof with a diametrically disposed rectangular slot 11 having a portion of enlarged width as at 11' to provide a clearance for a purpose to be referred to. The axis of the cheek is disposed at the intersection of the transverse and longitudinal medians of the slot. Each cheek also includes an annular channel forming part 12 arranged outwardly of and disposed in a plane parallel to the plane of the hub part 10. The part 12 opens inwardly and the channel provided thereby forms a race 7 or 8. The outer side wall 13 of the channel is of greater length in cross section than the cross sectional length of the inner wall 14 of the channel. The hub part 10 merges into an outwardly directed flared flange 15 which merges into the inner portion of the rear face of the inner wall 14 of the channel. The flange 15 is of arcuate cross section. Formed integral with the inner portion of the outer face of the outer wall 13 of the channel is an outwardly directed flared flange 16 which in cross section is inclined outwardly from its inner to its outer side. The flanges 16 coact to provide a guide and retaining means for the stretch 2 of the line or carrier. The flanges 16, and walls 13 coact with the rollers 9 to provide a channel 16' for the stretch 2, and with the inner wall of such channel consisting of closely related revoluble tubular sections.

The element 4 is in the form of a bar provided with vertically and horizontally disposed outer and inner end stretches 17, 18 respectively. The stretch 17 has its lower end arranged below the lower face of the stretch 18, and has its upper end merge into the outer end of a stretch 19 of substantially semi-elliptical curvature. The stretch 19 merges at its rear end into the outer end of a stretch 20 inclining downwardly with respect to stretch 19 and being upon a slight segmental curve. The rear end of stretch 20 merges into the outer end of stretch 18. The latter is formed with an opening 21. The stretch 17 consists of an upper wide part 22, a lower part 23 of less width than the part 22 and an intermediate part 24 is of less width than and disposed centrally with respect to parts 22, 23. The parts 23, 24 coact to provide the stretch 17 with a T-shaped lower terminal portion. The part 22 corresponds in width to that of stretch 20. The stretches 19, 20 and 21 are of the same width. The side edge portions of the part 24 are designated 25. The parts 22, 23 and 24 coact to lock the cheeks 5, 6 together in oppositely disposed relation with the hub parts 10 abutting. In this connection it will be stated that the slots 11 of the cheeks 5, 6 are aligned with each other and the part 23 is passed through the aligning slots 11 and element 4 given a quarter turn, so it will assume the position shown in Figure 4, whereby the edge portions 26 of part 22 and the edge portions 27 of part 23 will coact with the outer faces of the hub parts 10 and secure the cheeks 5, 6 together. The portion of enlarged width of the slot 11 of the cheeks 5, 6 forms clearances for the side edges 25 of part 24.

The stretch 19 of element 4 is of greater length than the stretches 17, 18 and 20, and is so shaped as to extend upwardly from the hub part 10 of cheek 5 and then over, rearwardly and downwardly with respect to the flange 16 of cheek 5.

When the device is in use, the pull thereon from the stretch 2 of the line or carrier, will cause the part 24 of the stretch 17 to abut the rear end walls of the aligning slots 11 of the cheeks 5, 6, as is shown in dotted lines Figure 3.

The rollers 9 are of a number to substantially fill the races 7, 8 and each has its ends loosely disposed in the races. The rollers 9 are formed of thin tubular metallic bodies for the purpose of reducing the weight of the device. The rollers 9 are of uniform diameter and closely disposed with respect to each other, but not to an extent to prevent the revolving thereof. That portion of each of the rollers 9 which forms a section of the bottom of the channel 16' for the stretch 2 is of a length greater than the diameter of the latter thereby providing an elongated bearing surface against which travels the stretch 2. The diameter of each of the rollers 9 is such as to permit it to freely revolve in the races.

The opening 21 in stretch 18 is provided for the passage of a pivotal connection, not shown for anchoring element 4 in an extended position with respect to a support. The curvature of element 4 is such to provide for the pivotal means to be substantially in the plane of the carrier channel.

What I caim is:—

1. In a device of the character described, a pair of opposed cheek plates, said plates having a pair of aligned, opposed annular bearing races formed in their adjacent faces respectively, a series of independent rollers of circular cross section, each extending from one of said cheek plates to the other and having its opposite ends loosely disposed in said races respectively, said rollers being sufficient in number to substantially fill said races, and means to secure said cheek plates together, said cheek plates being spaced from each other radially outwardly from said races to provide a carrier receiving channel.

2. In a device of the character described, a pair of opposed cheek plates, said plates having a pair of aligned, opposed, annular bearing races formed in their adjacent faces respectively, a series of independent hollow cylindrical rollers, each extending from one of said cheek plates to the other and having its opposite ends loosely disposed in said races respectively, said rollers being sufficient in number to substantially fill said races, and means to secure said cheek plates together, said cheek plates being spaced from each other radially outwardly from said races to provide a carrier receiving channel.

3. In a device of the character described, a pair of opposed cheek plates, said plates having a pair of aligned opposed annular bearing races formed in their adjacent faces respectively, a series of rotatable bearing members disposed between said plates and having parts loosely disposed within said respective races, said bearing members being sufficient in number to substantially fill said races, said cheek plates being spaced apart radially outwardly from said races to provide a carrier receiving channel, and a supporting element having means on one end thereof for cooperating with the central portions of said cheek plates to secure said plates together and to secure said element to said plates and having at the other end thereof means for receiving a pivotal suspension, said element being curved to position said last mentioned means substantially in the plane of said carrier channel.

4. In a device of the character described, a pair of opposed cheek plates, said plates having a pair of aligned, opposed annular bearing races formed in their adjacent faces respectively and registering openings formed in said plates centrally thereof, a series of rotatable bearing members disposed between said plates and having parts loosely disposed within said respective races, said bearing members being sufficient in number to substantially fill said races, said cheek plates being spaced apart radially outwardly from said races to provide a carrier channel, and a supporting element having one end formed to project through said aligned openings and secure said cheek plates together and having at the other end thereof means for the passage of a pivotal suspension, said arm being curved to position said last mentioned means substantially in the plane of said carrier channel.

5. In a device of the character described, a pair of opposed cheek plates, said plates having a pair of aligned opposed annular bearing races formed in their adjacent faces respectively and elongated registering openings formed in said plates centrally thereof, a series of rotatable bearing members disposed between said plates and having parts loosely disposed within said respective races, said bearing members being sufficient in number to substantially fill said channels, said cheek plates being spaced apart radially outwardly from said channels to provide a carrier slot, and a support arm of flattened cross section, said support arm having one end formed with a T-shaped tongue adapted to pass through said registering openings in the cheek plates and be rotated through substantially 90° to secure said plates together and having at its other end means for pivotally suspending the entire structure, said element being curved to position said last mentioned means substantially in the plane of said carrier slot.

6. In a device of the character described, a pair of opposed cheek plates, said plates having a pair of aligned opposed annular bearing races formed in their adjacent faces respectively and elongated generally rectangular registering openings formed in said plates centrally thereof, said openings each having a slightly widened part remote from one end thereof, bearing means disposed between said plates and having parts disposed within said respective races, said cheek plates being spaced apart radially outwardly from said races to provide a carrier channel, and a support arm of flattened cross section, said support arm having one end formed with a T-shaped terminal portion adapted to pass through said registering openings in the cheek plates, the leg of said terminal portion being of rectangular cross section of substantially the same width as the width of the narrower parts of said openings, whereby the leg of said portion may be rotated in the widened parts of said openings to secure the plates together, and may then be slid to one of the ends of said openings to prevent further rotation, and said element having at its other end means for pivotally suspending the entire structure, said element being curved to position said last mentioned means substantially in the plane of said carrier slot.

7. In a device of the character described, a pair of oppositely disposed cheek plates having a pair of apertured abutting hub parts, a pair of annular spaced parallel channel forming parts offset with respect to said hub parts and a pair of spaced outwardly inclined annular flanges extended from said channel forming parts, bearing means seated in one of the channel forming parts and extending to and seated in the other of such parts and providing in connection with said flanges and the channel forming parts a carrier receiving channel having its inner wall consisting of closely relating revoluble sections, and a suspension element for said cheeks having means coacting with the apertures of the hub parts and with the latter for securing said cheeks together, said element being curved, arranged over one of and extending beyond both of said cheek parts in a radial direction with respect to the latter.

8. In a device of the character described, a pair of oppositely disposed cheek plates having a pair of apertured abutting hub parts, a pair of annular spaced parallel channel forming parts offset with respect to said hub parts and a pair of spaced outwardly inclined annular flanges extended from said channel forming parts, closely related tubular bearing members seated at one end within one of the channel forming parts and extending to and having the other end seated in the other one of said channel forming parts and providing in connection with said flanges and the channel forming parts a carrier receiving channel having its inner wall consisting of closely related revoluble sections, and a suspension bar for said cheeks having means coacting with the apertures of the hub parts and with the latter for securing said cheeks together, said bar being curved, arranged over one and extending beyond both of said cheeks in a radial direction with respect to the latter.

CHESTER LIBRETT.